June 1, 1943.  J. W. MILLER  2,320,636

TANK CONNECTION

Filed Oct. 6, 1941

INVENTOR.
BY JOHN W. MILLER
Carroll R. Taber
ATTORNEY.

Patented June 1, 1943

2,320,636

UNITED STATES PATENT OFFICE 2,320,636

TANK CONNECTION

John W. Miller, Lansing, Mich., assignor to Motor Wheel Corporation, Lansing, Mich., a corporation of Michigan Application October 6, 1941, Serial No. 413,748

3 Claims. (Cl. 285—50)

This invention relates to tanks for fluids, and more particularly to the means for connecting supply pipes and discharging pipes thereto.

Heretofore in order to obtain a leakproof joint between a tank wall and a supply or discharge pipe, the practice has been to weld or braze a threaded spud into an opening in the tank wall and connect the pipe to the threaded spud. Tanks for storage of hot water, as well as tanks in which the water is heated directly, are now commonly being made of sheet metal and coated on the inside with enamel or other suitable corrosion resistant coating. In this type of tank it is not satisfactory to weld or braze the spud in place because of the difficulty in obtaining proper adhesion between the enamel coating and the metal at the welded joint. If the coating does not cover and adhere to the inside of the tank, corrosion soon occurs. On the other hand, it has been difficult to produce a watertight joint except by welding or brazing the spud to the tank wall.

Accordingly, the principal object of this invention is to provide means for connecting a pipe to a tank, which means will provide a leakproof joint, without welding or otherwise integrally uniting the parts with the tank wall.

Another object of the invention is to provide means of the character just described which can be connected to the tank from the exterior thereof after the tank has been otherwise completed and coated on the inside with a suitable corrosion resistant coating.

These objects and others ancillary thereto will more fully appear in the following specification when read in connection with the accompanying drawing, wherein—

Figure 1:
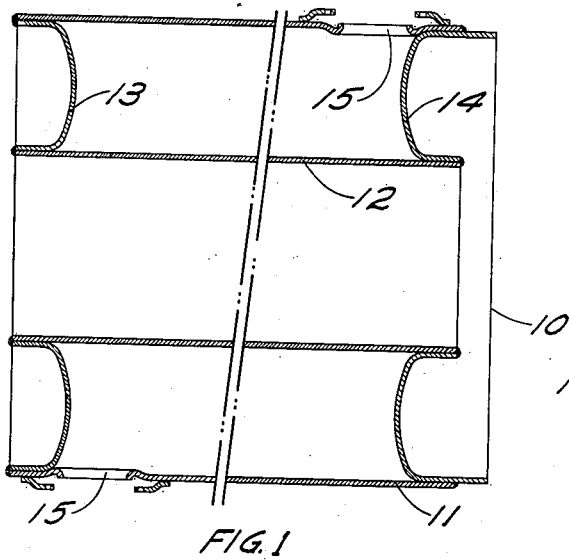
Figure 1 is a fragmentary cross-sectional view of a tank for heating hot water.

Referring now to the drawing in more detail, and particularly to Figures 1 to 4 thereof, the invention is shown as applied to a combined water heater and storage tank 10 formed from sheet steel. The tank comprises an outer cylindrical shell 11, a cylindrical combustion chamber 12 concentric with the outer shell, a top wall 13, and a bottom wall 14.

The various walls of the tank 10 are separately formed from sheet steel and thereafter coated with corrosion resistant coating 16, preferably a vitreous enamel, which is baked or fired thereon. The walls are then assembled into the relationship shown in Figure 1 and are welded together. The resulting structure is a hollow annular compartment surrounding the combustion chamber 12. Water is contained within this annular compartment.

Figure 3:
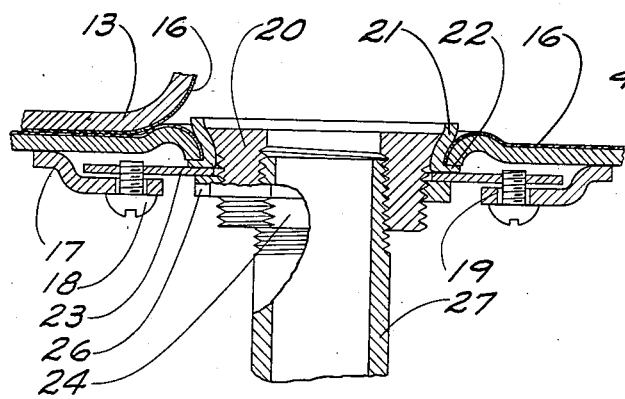
Figure 3 is a cross-sectional view taken on substantially the line 3—3 of Figure 2.

The outer shell 11 is provided with openings 15 into which the supply and discharge pipes are connected. The metal at the edges of the openings 15 preferably is curved outwardly as shown in Figure 3. The coating 16 extends to the extreme edges of the openings 15 so as to prevent water and air from gaining access to the steel on the interior of the tank.

On opposite sides of each opening 15 are L-shaped brackets 17. The brackets 17 are welded to the outer shell 11 of the tank and are provided with apertures 19 for the reception of screws 18, as will be more fully described later.

Figure 4:
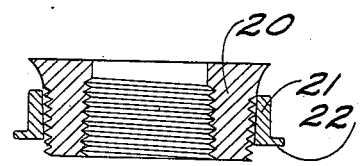
Figure 4 is a cross-sectional view of a spud and malleable washer employed in the construction shown in Figures 2 and 3.
Figure 2:
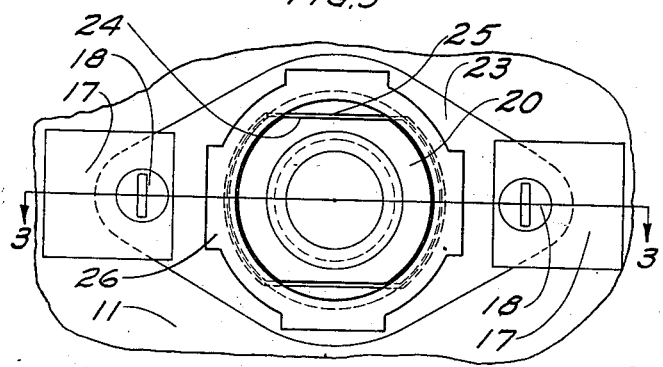
Figure 2 is a fragmentary elevational view of one means for connecting a pipe to the tank wall.

An internally bored and threaded spud 20 is located in the opening 15. Preferably the spud is formed of brass or some other corrosion resistant material. The end of the spud 20 inside of the tank 10 is substantially frusto-conical, as indicated in Figures 3 and 4. Its maximum diameter is slightly less than the diameter of the opening 15, to permit insertion of the spud into the opening from the outside of the tank. The end of the spud outside of the tank is threaded and is flattened on two opposite sides as indicated at 24.

An annular washer 21 having a radial flange 22 at its outer end surrounds the spud 20. The washer 21 is formed from malleable metal, preferably lead. Its internal diameter is approximately that of the small end of the spud 20. The exterior diameter of the flange 22 is greater than the diameter of the opening 15. The spud 20 and the washer 21 are assembled in the relationship shown in Figure 4 and the large end of the spud inserted into the opening 15 until the flange 22 on the washer strikes the outer face of the tank wall surrounding the opening.

A flat plate 23 provided with an opening therein to receive the spud 20 is slipped over the small end of the spud 20. The opening in the plate is of the same shape as the cross-section of the small end of the spud 20. That is, it has flattened opposite sides, as at 25, to engage corresponding flattened surfaces 24 on the spud. The plate 23 has small openings at its ends registering with the openings 19 in the brackets 17 and is secured to the tank by screws 18 inserted into the openings 19 and then threaded into the corresponding openings in the ends of the plate 23. This prevents rotation of the plate 23 which in turn prevents rotation of the spud 20 but permits axial movement thereof.

A nut 26 is threaded onto the small end of the spud 20 and drawn up tightly against the plate 23. Drawing up the nut 26 pulls the spud 20 axially outwardly through the opening 15. Axial movement of the washer 21 is prevented by engagement of the flange 22 with the plate 23 so that the spud moves within the washer and the frusto-conical inner end of the spud expands the washer as indicated in Figure 3. The washer is jammed tightly between the tank wall about the opening 15 and the frusto-conical surface of the spud 20, thereby forming a leakproof joint. The washer extends over the coating 16 an appreciable distance, and due to its tight engagement therewith, prevents water from leaking between the washer and the coating to a point where it can cause corrosion of the steel.

The installation of a supply or discharge pipe 27 is completed by threading one end of the latter and screwing it into the threaded spud 20.

Figure 5:
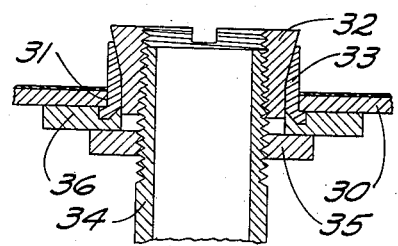
Figure 5 is a cross-sectional view of a modified form of the invention showing the parts in partially assembled relationship.
Figure 6:
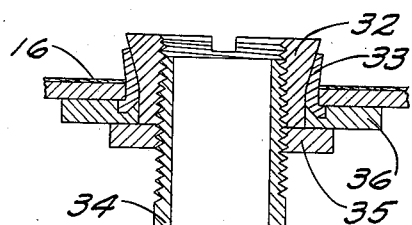
Figure 6 is a cross-sectional view of the structure shown in Figure 5 in its final assembled position.

Figures 5 and 6 illustrate a somewhat modified form of the invention. In this modification the tank is designated by the numeral 30. A wall of the tank is provided with an opening 31 for the reception of a spud 32 whereby a pipe 34 may be connected to the tank wall.

The end of the pipe 34 is threaded. A nut 35 is threaded onto the pipe 34 and run a considerable distance from the end. Next, a ring 36 to which is secured a lead washer 33 of L-shaped section is slipped over the end of the pipe. The external diameter of the washer is slightly less than that of the opening 31.

An internally threaded tapered spud 32 having a maximum external diameter slightly less than that of the opening 31 is threaded onto the extreme end of the pipe 34. The small end of the spud 32 is positioned within the lead washer 33.

The end of the pipe 34 and the spud 32 are inserted into the opening 31, in the manner indicated in Figure 5, and then the nut 35 is threaded home so as to pull the pipe 34 and the spud attached thereto axially outwardly. In so doing, the malleable washer 33 is expanded to tightly engage the spud, the tank wall about the opening, and the coating surrounding the opening, as shown in Figure 6. This provides a leakproof joint.

Figure 7:
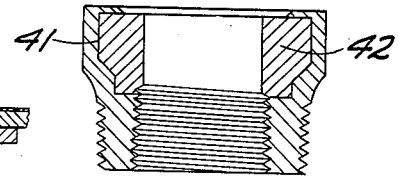
Figure 7 is a cross-sectional view of a modified form of spud.

The spud shown in Figure 7 is a modified form which may be employed in place of either of the spuds 20 and 32 previously described. The spud is in most respects practically identical to the spud 20 and is employed in the same manner. It is provided with an annular recess 41 in which a ring 42 of zinc is embedded. The zinc ring 42 is so located that when the spud is in place and the tank is filled with water the ring is in contact with the water. It has been found that there is sufficient electrolytic action between the zinc, the water and the other metal parts to cause the electro-deposit of zinc from the ring 42 upon any exposed metal parts within the tank. Thus, if there should be a slight defect in the coating at any place within the tank it will soon be covered with zinc and thereby protected, shortly after the tank has been placed in service.

From the foregoing it will be apparent that this invention provides a novel means for providing a water-tight connection between a pipe and a water tank. Not only does it prevent the leakage of water from the tank, but it also prevents water and air from reaching any exposed steel of the wall around the joint. At the same time the device is easily assembled and connected to the tank from the exterior thereof after the tank has been otherwise completely assembled.

The scope of the invention is indicated in the appended claims.

I claim:

1. In a fluid container having an opening in a wall thereof, means for connecting a pipe to said container at said opening, said means comprising a generally frusto-conical spud located in said opening, a malleable ring surrounding the spud and located in said opening, said ring having a portion of less external diameter than the diameter of said opening, the greatest diameter of said spud being slightly less than that of said opening and greater than the internal diameter of said malleable ring, means engaging the spud exteriorly of the container and attached to the latter for holding the spud against rotation relative to the opening, and screw threaded means connected to the spud exteriorly of the container for drawing the spud axially of the opening and said ring to expand said ring tightly against the container wall about the opening.

2. In a fluid container having an opening in a wall thereof, means for connecting a pipe to said container at said opening, said means comprising a generally frusto-conical spud located in said opening, a malleable ring surrounding the spud and located in said opening, said ring having a portion of less external diameter than the diameter of said opening, the greatest diameter of said spud being slightly less than that of the opening and greater than the internal diameter of said malleable ring, the larger end of the spud being inside of the container and the smaller end being outside of the container, a plate having an opening therein slidably receiving the small end of the spud and engaging the outer end of said malleable ring, means for securing said plate to the container wall, and screw threaded means on the small end of the spud exteriorly of said plate for drawing the spud axially outward relative to the plate and the container wall.

3. A fluid container as defined in claim 2 wherein the small end of said spud is of non-circular cross-section and the opening in said plate is shaped to receive said small end of the spud and prevent rotation thereof relative to the container.

JOHN W. MILLER.